(12) United States Patent
Prakapenka et al.

(10) Patent No.: US 11,099,134 B2
(45) Date of Patent: Aug. 24, 2021

(54) OPTICAL EXAMINATION DEVICE AND OPTICAL EXAMINATION METHOD WITH VISIBLE AND INFRARED LIGHT FOR SEMICONDUCTOR COMPONENTS

(71) Applicant: Muehlbauer GmbH & Co. KG, Roding (DE)

(72) Inventors: Uladimir Prakapenka, Roding (DE); Stephan Spichtinger, Oberviechtach (DE); Rainer Miehlich, Taufkirchen (DE)

(73) Assignee: MUEHLBAUER GMBH & CO. KG, Roding (DE)

( * ) Notice: Subject to any disclaimer, the term of this patent is extended or adjusted under 35 U.S.C. 154(b) by 239 days.

(21) Appl. No.: 16/334,672

(22) PCT Filed: Sep. 19, 2017

(86) PCT No.: PCT/EP2017/073619
§ 371 (c)(1),
(2) Date: Mar. 19, 2019

(87) PCT Pub. No.: WO2018/054895
PCT Pub. Date: Mar. 29, 2018

(65) Prior Publication Data
US 2021/0010944 A1    Jan. 14, 2021

(30) Foreign Application Priority Data
Sep. 21, 2016  (DE) .................. 10 2016 011 497.5

(51) Int. Cl.
*G01N 21/88*   (2006.01)
*G01N 21/95*   (2006.01)

(52) U.S. Cl.
CPC ..... *G01N 21/8806* (2013.01); *G01N 21/9505* (2013.01); *G01N 2021/8816* (2013.01); *G01N 2201/062* (2013.01)

(58) Field of Classification Search
CPC ............. G01N 21/9501; G01N 21/956; G01N 21/8806; G01N 21/9505; G01N 21/47;
(Continued)

(56) References Cited

U.S. PATENT DOCUMENTS

| 6,094,263 A | 7/2000 | Tomiya et al. |
| 2003/0059103 A1* | 3/2003 | Shiomi ................ G01N 21/956 |
| | | 382/144 |

(Continued)

FOREIGN PATENT DOCUMENTS

| DE | 102008028869 A1 | 12/2009 |
| DE | 112008002282 T5 | 7/2010 |

(Continued)

*Primary Examiner* — Michael P Stafira
(74) *Attorney, Agent, or Firm* — John A. Miller; Shumaker, Loop & Kendrick, LLP

(57) ABSTRACT

An optical examination device is designed to detect properties of a semiconductor component. The device comprises a first illumination arrangement, a second illumination arrangement and an imaging device, where the first illumination arrangement emits infrared light onto a first surface of the semiconductor component, which faces away from the imaging device (camera). The infrared light fully penetrates the semiconductor component at least proportionally. The second illumination arrangement emits visible light onto a second surface of the semiconductor component, which faces the imaging device. The imaging device is designed and arranged to detect the light spectrum emitted from both the first and the second illumination arrangement, and as a result of a subsequent image evaluation on the basis of both the visible and the infrared light spectrum, to provide a (Continued)

separate image reduction for determining property defects or damage of the semiconductor component.

10 Claims, 3 Drawing Sheets

(58) Field of Classification Search
CPC ........... G01N 2201/062; G01N 15/082; G01N 2033/0096; G01N 21/33; G01N 21/94; G01N 2201/06113; G01N 2021/8887; G01N 21/95; G01N 21/95684; G01N 2201/0697; G01N 23/2273; G01N 30/7206; G01N 33/00; G01N 2021/8829; G01N 2021/8835; G01N 2021/8848; G01N 21/21; G01N 21/6489; G01N 21/88; G01N 21/8851; G01N 2021/8427; G01N 2021/8822; G01N 2021/95615; G01N 21/59; G01N 21/64; G01N 21/8422; G01N 21/9503; G01N 21/95607; G01N 2201/02; G01N 2201/10; G01N 15/0612; G01N 15/1434; G01N 15/1468; G01N 2015/0046; G01N 2021/0143; G01N 2021/0162; G01N 2021/0342; G01N 2021/216; G01N 2021/646; G01N 2021/8825; G01N 2021/8838; G01N 2021/8896; G01N 2021/9513; G01N 2021/95676; G01N 21/01; G01N 21/1717; G01N 21/23; G01N 21/3563; G01N 21/6408; G01N 21/648; G01N 21/89; G01N 2201/0221; G01N 2201/0694; G01N 2201/0696; G01N 2201/125; G01N 33/487; G01N 33/49; G01N 33/54373; G01N 21/93; G01N 21/9515; G01N 2021/8812; G01N 29/226; G01N 19/08; G01N 2021/1706; G01N 2021/6439; G01N 2021/8472; G01N 2021/8816; G01N 2021/8867; G01N 2021/8883; G01N 2021/9511; G01N 2021/9518; G01N 2021/95638; G01N 21/1702; G01N 21/25; G01N 21/3581; G01N 21/51; G01N 21/553; G01N 21/6428; G01N 21/8803; G01N 21/892; G01N 21/9018; G01N 21/9506; G01N 21/951; G01N 2201/1296; G01N 2291/0231; G01N 2291/0232; G01N 2291/044; G01N 2291/048; G01N 2291/102; G01N 2291/2694; G01N 27/3272; G01N 29/043; G01N 29/045; G01N 29/221; G01N 29/2418; G01N 29/265; G01N 29/343; G01N 29/36; G01N 29/4445; G01N 33/48721; G01N 33/54353; G01N 33/5438; G01J 1/0411; G01J 1/0422; G01J 1/4228; G01J 3/108; G01J 3/42; G01J 3/50; G01J 2003/102; G01J 2003/423; G01J 3/0218; G01J 3/0245; G01J 2003/425; G01J 3/0202; G01J 3/0205; G01J 3/0208; G01J 3/0224; G01J 3/0237; G01J 3/0264; G01J 3/0289; G01J 3/0291; G01J 3/32; G01J 5/04; G01J 5/0812; G01J 5/0825; G01J 5/0831; G01J 5/20; G02B 1/18; G02B 1/115; G02B 21/0016; G02B 21/06; G02B 21/16; G02B 5/283; G02B 5/285; G02B 6/29349; G02B 1/04; G02B 1/14; G02B 5/3058; G02B 6/125; G02B 6/30; G02B 6/3612; G01B 11/303; G01B 9/02091; G01B 11/0616; G01B 11/0625; G01B 11/16; G01B 11/165; G01B 11/2408; G01B 11/245; G01B 11/25; G01B 11/2527; G01B 11/2536; G01B 11/254; G01B 11/255; G01B 2210/52; G01B 7/004; G01B 7/282; G01B 7/293; G01B 7/34

See application file for complete search history.

(56) References Cited

U.S. PATENT DOCUMENTS

| | | | |
|---|---|---|---|
| 2005/0146719 A1* | 7/2005 | Chhibber | G01N 21/9501 356/370 |
| 2008/0014073 A1* | 1/2008 | Moore | H01L 21/67288 414/796 |
| 2008/0107509 A1 | 5/2008 | Whitcomb et al. | |
| 2009/0004859 A1 | 1/2009 | Kimura et al. | |
| 2010/0150430 A1* | 6/2010 | Mitsui | G06T 7/0004 382/149 |
| 2011/0025838 A1* | 2/2011 | Ninomiya | G01N 21/9501 348/87 |
| 2014/0154037 A1* | 6/2014 | Sen | H01L 21/67144 414/744.2 |
| 2014/0328652 A1* | 11/2014 | Cheng | H01L 21/67718 414/223.01 |
| 2015/0253256 A1* | 9/2015 | Zhou | G01B 11/02 356/237.5 |
| 2016/0223470 A1 | 8/2016 | O'Dell et al. | |
| 2017/0191946 A1* | 7/2017 | Smith | G01N 21/89 |
| 2017/0249727 A1* | 8/2017 | Mayumi | G06T 7/60 |
| 2018/0101945 A1* | 4/2018 | Stone | G06N 3/0436 |
| 2019/0293566 A1* | 9/2019 | Lu | G01N 21/88 |

FOREIGN PATENT DOCUMENTS

| | | |
|---|---|---|
| DE | 102010053912 B4 | 1/2013 |
| DE | 102012010406 A1 | 3/2013 |
| WO | 2009124817 A1 | 10/2009 |

* cited by examiner

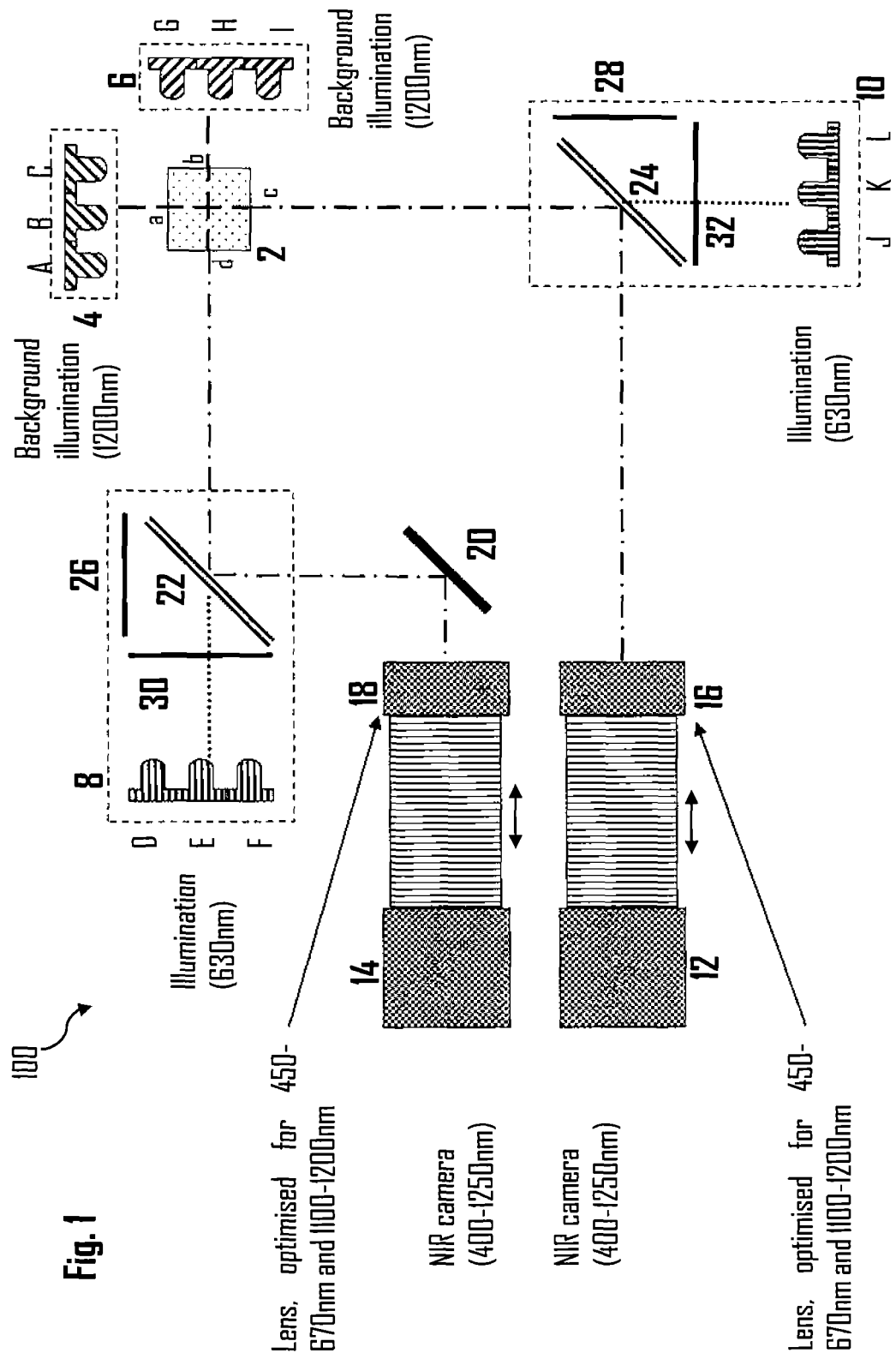

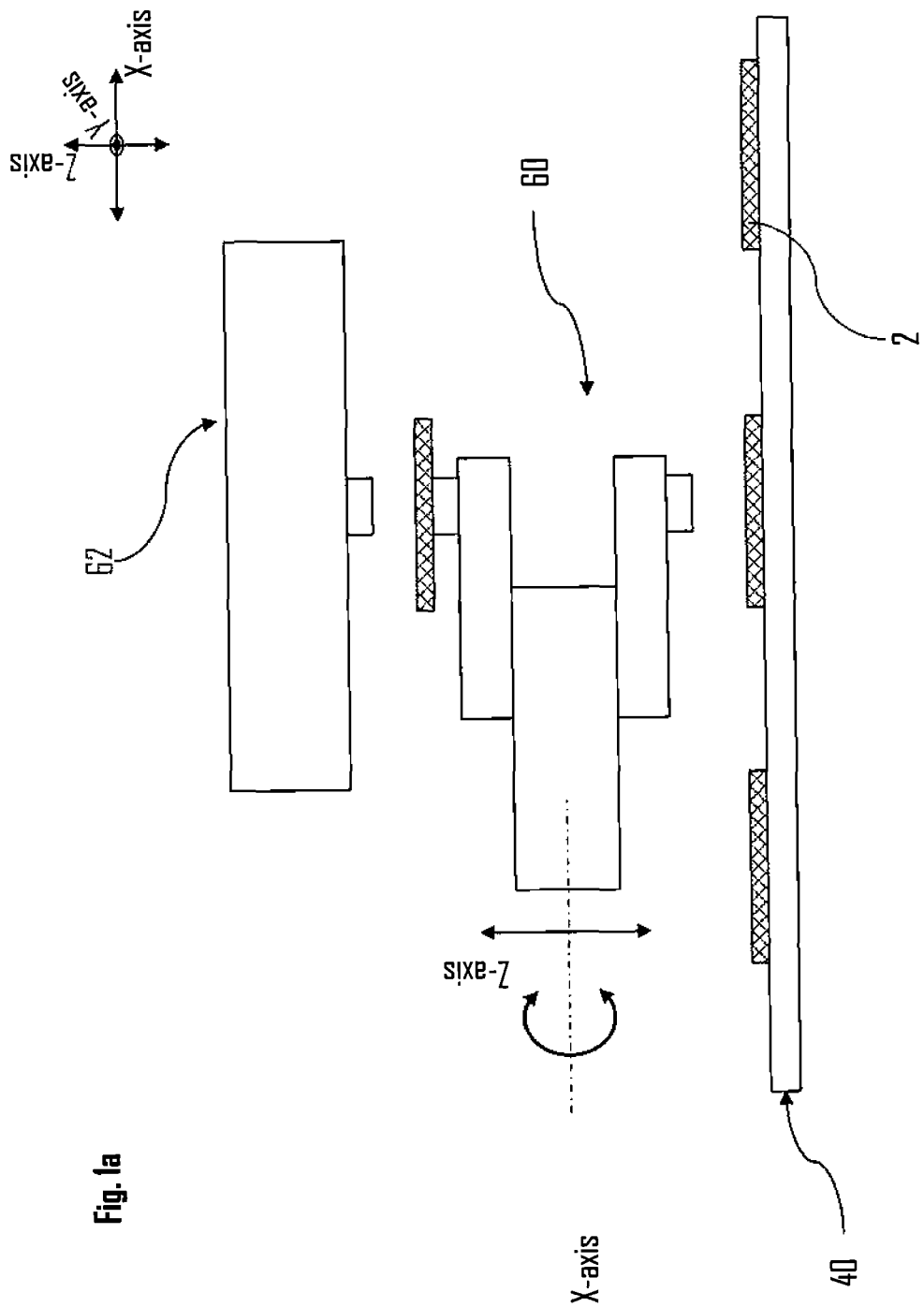

OPTICAL EXAMINATION DEVICE AND OPTICAL EXAMINATION METHOD WITH VISIBLE AND INFRARED LIGHT FOR SEMICONDUCTOR COMPONENTS

CROSS-REFERENCE TO RELATED APPLICATIONS

This application is a National Stage application of International Application No. PCT/EP2017/073619 filed Sep. 19, 2017, which claims priority to German Patent Application Serial No. DE 10 2016 011 497.5, filed Sep. 21, 2016.

BACKGROUND

Field

An optical examination device with visible and infrared light for semiconductor components is described here.

Discussion

A semiconductor component is an electronic semiconductor component, for example, consisting predominantly of silicon, also termed "chip" or "die". A component of this kind usually has a rectangular or square cross section with several lateral surfaces as well as an end face and a cover surface. The lateral surfaces and the two (bottom and top) cover surfaces of the component are generally termed surfaces below. The component can also have a number of lateral surfaces different from four.

From the operational practice of the applicant, so-called pick-up and deposition devices are known, in which components are picked up by means of a suction cup or holder from a component table and then placed on a carrier or in a transport container or similar. Prior to putting the component down, an inspection of the component normally takes place. To this end images of one or more lateral faces of the component are captured using one or more cameras and evaluated by means of automatic image processing.

Optical examination devices for the inspection of semiconductor components during or after completion of the manufacturing operation are known as the prior art. DE 10 2010 053 912 B4 of the same applicant discloses an optical examination device and an optical examination method for the external inspection of electronic components, containing a component conveying mechanism, which conveys the components into different examination areas. In the different examination areas, different surfaces of the component are illuminated and images of different surfaces are captured by means of a camera arrangement.

The document DE 10 2012 010 406 A1 discloses a device for examination of a solar cell. In this the solar cell is illuminated successively by light of a different wavelength or colour. Freedom of the solar cell from external damage is verified by means of respectively captured images. In addition to this, the rear side of the solar cell is illuminated with infrared light, which partially penetrates the solar cell. By means of an image captured in the infrared range, freedom of the solar cell from internal damage is verified.

The document DE 11 2008 002 282 T2 discloses a device for the inspection of circuit boards. A circuit board is exposed in this case to successive irradiations at different wavelengths in each case. Images are respectively captured and compared with reference images to verify the freedom of the circuit board from damage. The irradiations can comprise light in the infrared or near-infrared wavelength range.

The document WO 2009/124817 A1 shows an optical detection device and a method for detecting surfaces of components. Here the surface of a component is illuminated by light from different light sources and at different wavelengths, while a camera device captures images of the component.

The document U.S. Pat. No. 6,094,263 A shows a device for the optical inspection of semiconductor components. The recording of a plurality of lateral surfaces of the component on a common image capture is made possible by an arrangement of optically active elements.

SUMMARY

An improved optical examination device is to enable an inspection of a semiconductor component for damage or property defects from several viewing directions.

This object is achieved by an optical examination device which is suitable and designed to detect properties of a component, in particular in a component handling apparatus, which contains the optical examination device. The examination device has at least two detection spectra diverging from one another, wherein one of the detection spectra is to be associated with the infrared range. It is in particular suitable and designed to detect simultaneously property defects on the surface and in the interior of a semiconductor component. The optical examination device contains an imaging device, which is suitable and designed to cooperate with radiation sources that are coordinated to one another in respect of their radiation spectrum and their radiation incident angle. The imaging device is suitable and configured to provide a separate image capture for each of the detection spectra for image evaluation downstream of it.

The optical examination device presented here is suitable and designed to detect properties of a semiconductor component. It comprises a first illumination arrangement, a second illumination arrangement and an imaging device. The first illumination arrangement is suitable and designed to emit infrared light perpendicularly onto two surfaces of the semiconductor component respectively facing away from the imaging device, wherein the infrared light fully penetrates the semiconductor component at least proportionally. The second illumination arrangement is suitable and designed to emit visible light, in particular red light, perpendicularly onto two surfaces of the semiconductor component respectively facing the imaging device. The illumination of the semiconductor component by the first and the second illumination arrangement takes place at the same time. The imaging device is configured and arranged to detect the light spectrum emitted both by the first and by the second illumination arrangement and to provide for downstream image evaluation, on the basis of both the visible and the infrared light spectrum, a separate image capture in each case for determining property defects and/or damage of the semiconductor component. Here the imaging device uses the same optical beam path, at least in sections, to record the visible light reflected by the surfaces of the component and to record the infrared light penetrating the component.

In one variant the optical examination device contains a number of optically active elements, in particular deflection mirrors, prisms, colour filters and/or lenses, which are suitable for visible and/or infrared light.

In one variant the optical examination device contains at least one half mirror, wherein the half mirror is arranged at an angle of approximately 45° to the optical axis of the imaging device and is used to couple light of the first and/or second illumination arrangement optically and to direct it onto the component. The half mirror is suitable and arranged in this case to direct the visible light reflected by the component and the infrared light penetrating the component onto the imaging device.

In one variant the first and/or second illumination arrangement consists respectively of one or more LED(s). The LED(s) of the first illumination arrangement is/are suitable to emit infrared light (1200 nm plus minus 100 nm) and/or the LED(s) of the second illumination arrangement is/are suitable to emit visible, for example red, light (for example, 630 nm plus minus 30 nm).

In one variant the LED(s) of the first and/or second illumination arrangement is/are arranged so that they illuminate a plurality of surfaces respectively of the semiconductor component. This can also be realised in that one/more optically active element(s) is/are used to direct the light emitted by the LED(s) onto a plurality of surfaces of the semiconductor component.

The imaging device comprises two imaging sensors, in particular camera sensors. The first and the second imaging sensor are pointed, directly or by means of optically active elements, at two different surfaces of the semiconductor component. The first and the second imaging sensor are furthermore configured and arranged to detect and to process both the visible light emitted by the first illumination apparatus and the infrared light emitted by the second illumination apparatus. The two imaging sensors are further configured and arranged to provide a separate image capture in each case for downstream image processing both on the basis of the visible light and on the basis of the infrared light.

In one variant the first illumination arrangement and/or the second illumination arrangement and/or a single or a plurality of optically active element(s) is configured and arranged to be oriented and/or calibrated/focused independently of the others in each case.

A method for the optical examination of semiconductor components comprises the following method steps:
illumination of two different surfaces of a semiconductor component with infrared light, which fully penetrates the semiconductor component at least proportionally,
illumination of two different surfaces of the semiconductor component with visible light, wherein the surfaces illuminated with visible light lie respectively opposite the surfaces illuminated with infrared light,
detection of the visible light reflected by the two surfaces of the component illuminated by visible light and of the infrared light penetrating the component from the two surfaces illuminated by infrared light by at least one imaging device, in particular a camera, which uses at least partially the same optical beam path for this,
production of at least one image capture respectively, based on the visible light used for illumination and on the infrared light used for illumination, by the imaging device. In particular, production of two image captures respectively in the direction of the two surfaces of the component illuminated by visible light, wherein one of the two image captures is produced on the basis of the visible light reflected by the component surface and one is produced on the basis of the infrared light penetrating the component.
examination of the component for deficiency or defectiveness by downstream image evaluation by means of the image captures.

Other features, properties, advantages and possible modifications become clear to a person skilled in the art by means of the following description, in which reference is made to the enclosed drawings.

BRIEF DESCRIPTION OF THE DRAWINGS

The figures show schematically two exemplary embodiments for an optical examination device for a semiconductor component, without restricting the variants of the device described to these.

FIG. 1 shows schematically an examination device for semiconductor components in which two cameras simultaneously detect two surfaces of a semiconductor component with a rectangular outline, which surfaces adjoin one another at right angles and are illuminated by red light. At the same time, the examination device enables infrared light to shine through the component along two orthogonal axes and permits detection by the two cameras of the infrared light conducted through the component.

FIG. 1a shows schematically a side view of an extraction device for picking up the semiconductor components detached from a substrate.

DETAILED DESCRIPTION OF THE EMBODIMENTS

Figure 2:
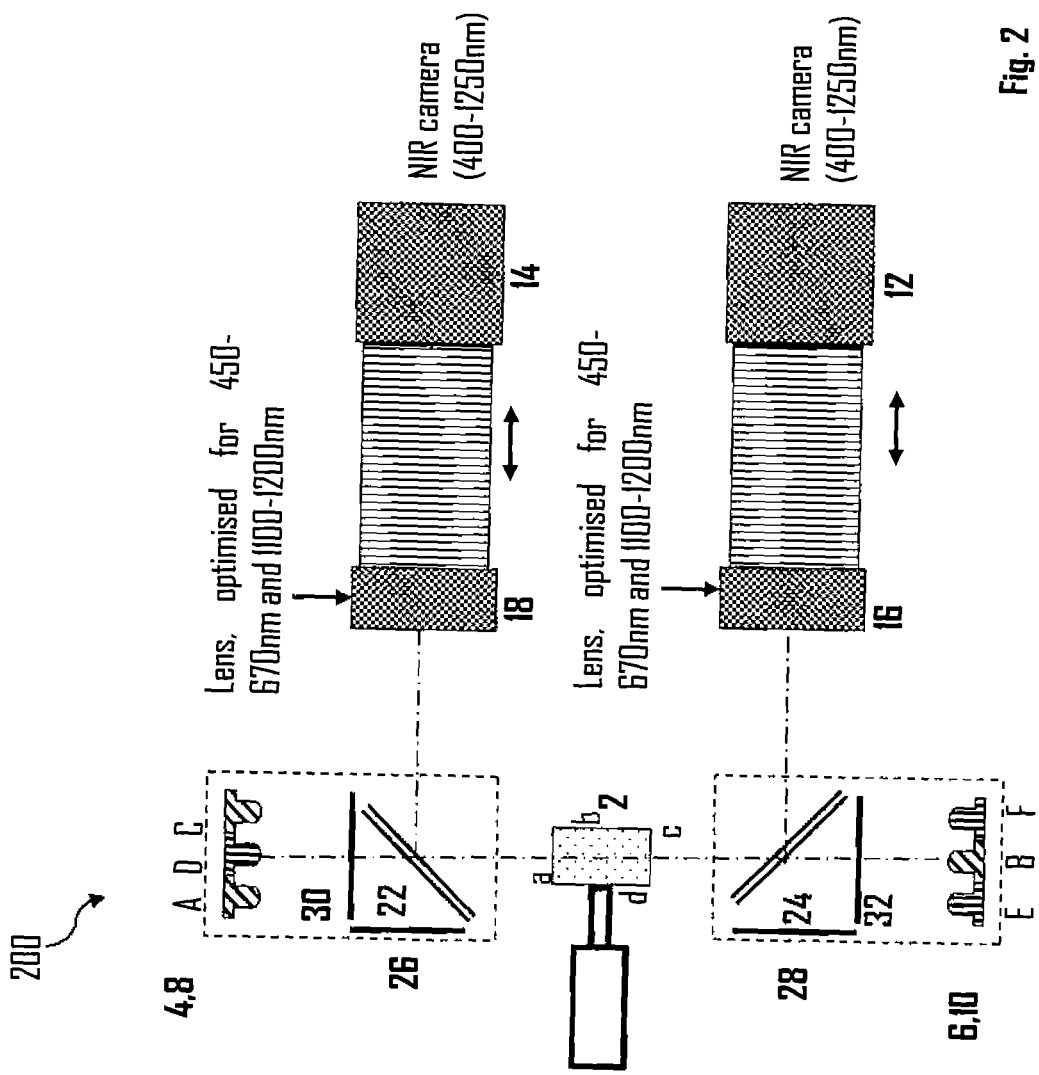
FIG. 2 shows schematically an examination device for semiconductor components, in which two cameras simultaneously detect two opposing surfaces of a semiconductor component with a rectangular outline. At the same time, the examination device enables infrared light to shine through the component and permits the detection by the two cameras of the infrared light conducted through the component.

FIG. 1 shows an optical examination device 100. In this, a surface a and a surface b of a semiconductor component 2 with a rectangular outline are each illuminated with infrared light (1200 nm) by a first illumination arrangement 4, 6. The illumination arrangement 4, 6 consists here of two sub-arrangements arranged at right angles to one another, which are formed in turn of three LEDs each. The sub-arrangement 4 is formed by the LEDs A, B and C and the sub-arrangement 6 is formed by the LEDs G, H and I, wherein both the LEDs A, B and C and the LEDs G, H and I are suitable and designed to emit infrared light (1200 nm) perpendicularly (90° plus minus up to 20°) onto the two surfaces a and b of the component 2.

Since semiconductor materials, in particular silicon, have a transparent characteristic in relation to infrared light, in particular in the near-infrared range (approx. 780 nm, in particular 1000 nm, up to approx. 3000 nm/abbreviation: NIR), at least a portion of the infrared light emitted by the illumination arrangement 4, 6 fully penetrates the semiconductor component 2. The infrared light incoming perpendicularly into the semiconductor component 2 at the surfaces a and b thus emerges again perpendicularly, at least partially, at the surfaces c and d.

At the same time, the two surfaces c and d of the semiconductor component 2 are illuminated by a second illumination arrangement 8, 10 with red light (630 nm). The illumination arrangement 8, 10 consists in this case of two sub-arrangements arranged at right angles to one another, which are formed in turn of three LEDs each. The sub-arrangement 8 is formed by the LEDs D, E and F and the sub-arrangement 10 is formed by the LEDs J, K and L, wherein both the LEDs D, E and F and the LEDs J, K and L are suitable and designed to emit red light (630 nm) perpendicularly (90° plus minus up to 20°) onto the surfaces c and d of the component 2.

The red light emitted by the sub-arrangements 8 and 10 initially passes a focusing lens 30, 32 and then a half mirror 22, 24 in this case before it impinges perpendicularly upon the component surfaces c, d. Shielding 26, 28 of black film prevents the occurrence of undesirable stray or scattered light.

The half mirrors 22 and 24 are positioned in the device shown at a 45° angle relative to the emission direction of the sub-arrangements 8 and 10 and are suitable and designed to conduct the light emitted by the second illumination arrangement 8, 10 in the direction of the component 2, but to reflect the light reflected in the opposite direction by the component surfaces c and d at a 90° angle relative to the respective emission direction of the sub-arrangements 8 and 10.

Furthermore, the half mirrors 22, 24 are suitable and designed to reflect the infrared light of the illumination arrangement 4, 6 emerging from the component surfaces c and d in the same manner as the red light originating from these directions, which light was reflected by the component surfaces c and d.

A mirror 20 serves in the device shown in FIG. 1 to direct the optical beam path of the red and infrared light reflected by the half mirror 22 parallel to the red and infrared light reflected by the half mirror 24.

FIG. 1 also shows two cameras 12 and 14, which are positioned so that they each detect the red and infrared light originally emitted by the sub-arrangements 4, 8 or 6, 10. The detection directions of the two cameras 12 and 14 are pointed respectively at one of the two surfaces c, d of the semiconductor component illuminated with visible light.

The cameras 12 and 14 shown in FIG. 1 are suitable both for producing image captures on the basis of visible red light and for producing image captures on the basis of infrared light. The camera lenses 16 and 18 of the cameras 12 and 14 are optimised respectively for a wavelength range of 450-670 nm and 1100-1200 nm. Furthermore, the cameras are configured and arranged to make image captures available to downstream image evaluation for inspection of the component, in particular to determine damage and/or property defects, based respectively on red and infrared light.

In the image evaluation, the decision (reject, forward) regarding the components currently being examined is made by means of image processing and/or by means of comparison with image captures of defect-/damage-free components.

An advantage of this examination arrangement consists in the fact that two surfaces a, b of the component 2 (due to image captures based on red light) can be checked for external damage and/or property defects and at the same time (due to image captures based on infrared light) the interior of the component 2 can be checked for damage and/or property defects without changing the position of the camera sensors. The surfaces c, d can be checked in the same way following rotation of the component in an examination plane by 180°.

A side view of an extraction device for picking up semiconductor components 2 detached from a substrate 40 is shown in FIG. 1a.

Arranged on the side of a substrate 40 facing away from the examination device 100 is a detachment unit (ejection pin or laser), which is configured to detach a semiconductor component 2 from the substrate 40 at least partially.

In this depiction a detachment unit for detaching the semiconductor components 2 provided on the substrate 40 is not shown for reasons of clarity. The examination device from FIG. 1 is also not shown.

The extraction device comprises a receiving unit 60, which is configured to receive the detached semiconductor components 2 from the substrate 40 and to turn these by means of a rotary movement about the X-axis by 180° and transport them to a transfer position for another receiving unit 62.

To this end the receiving unit 60 is further configured to be moved along the Z-axis. The receiving unit 60 further comprises two or more pick-ups on its periphery. The other receiving unit 62 is configured to receive the semiconductor components 2 at the transfer position from the receiving unit 60 and convey them to an examination position (depicted in FIG. 1).

The transfer position lies in the examination plane and can coincide with the examination position or be different from it. The image acquisition axes of the cameras 12, 14 in FIG. 1 lie in the examination plane.

The receiving unit 62 is further configured to store the semiconductor components 2 following examination of the semiconductor components 2 in the examination position in an intermediate store 64; the other receiving unit 62 is movable accordingly along the Y-axis and the Z-axis, as well as being rotatable about the Z-axis. The receiving unit 60 and the other receiving unit 62 are provided here as vacuum grippers.

FIG. 2 shows an optical examination device 200. In this a surface a and a surface c of a semiconductor component 2 with a rectangular outline are illuminated respectively with infrared light (1200 nm) by a first illumination arrangement 4, 6 and simultaneously with red light (630 nm) by a second illumination arrangement 8, 10.

The first illumination arrangement 4, 6 consists in this case of two sub-arrangements 4 and 6, which lie opposite in relation to the semiconductor component 2 and are each formed of LEDs. The sub-arrangement 4 is formed by the LEDs A and C and the sub-arrangement 6 is formed by the LED B, wherein the LEDs A, B and C are each suitable and designed to emit infrared light (1200 nm) perpendicularly onto one of the surfaces a and c of the component 2.

The second illumination arrangement 8, 10 illuminates the surface a and c with red light (630 nm). The illumination arrangement 8, 10 consists here of two sub-arrangements 8 and 10, which lie opposite in relation to the semiconductor component 2 and are each formed of LEDs. The sub-arrangement 8 is formed by the LED D and the sub-arrangement 10 is formed by the LEDs E and F, wherein the LEDs D, E and F are each suitable and designed to emit red light (630 nm) perpendicularly onto one of the surfaces c and a of the component 2.

At least a portion of the infrared light emitted by the illumination arrangement 4, 6 fully penetrates the semiconductor component 2. The infrared light entering the semiconductor component 2 perpendicularly (90° plus minus up to 20°) at the surfaces a and c thus emerges again, at least partially, at the respectively opposing surfaces c and a.

In FIG. 2 the red and infrared light emitted by the illumination arrangements 4, 6, 8, 10 initially passes a focusing lens 30, 32 in each case and then a half mirror 22, 24 before it impinges perpendicularly on the component surfaces c, a. Shielding 26, 28 of black film prevents the occurrence of undesirable stray or scattered light.

The half mirrors 22 and 24 are positioned in the device shown in FIG. 2 at a 45° angle relative to the emission direction of the illumination arrangements 4, 6, 8, 10 and are suitable and designed to conduct the light emitted by the illumination arrangements 4, 6, 8, 10 in the direction of the component 2, but to reflect the light reflected in the opposite direction by the component surfaces a and c at a 90° angle relative to the emission direction of the illumination arrangements 4, 6, 8, 10.

Furthermore, the half mirrors 22, 24 are suitable and designed to reflect the infrared light of the illumination arrangement 4, 6 emerging from the component surfaces a and c in the same manner as the red light originating from these directions, which light was reflected previously by the component surfaces a and c.

The device further shows two cameras 12 and 14, which are positioned so that they are suitable to each detect the red or infrared light originally emitted by the sub-arrangements 4, 10 or 6, 8. The detection directions of the two cameras 12 and 14 are pointed respectively at one of the two surfaces a, c of the semiconductor component illuminated with visible light.

The cameras 12 and 14 shown in the device are suitable both for capturing images on the basis of red light and for capturing images on the basis of infrared light. The camera lenses 16 and 18 of the cameras 12 and 14 are optimised respectively for a wavelength range of 450-670 nm and 1100-1200 nm. Furthermore, the cameras are configured and arranged to make image captures available to downstream image evaluation for inspection of the component, in particular to determine damage and/or property defects, based respectively on red and infrared light.

An advantage of this examination arrangement consists in the fact that two surfaces a, c of the component 2 (due to image captures based on red light) can be checked for external damage and/or property defects and at the same time (due to image captures based on infrared light) the interior of the component can be checked for damage and/or property defects without changing the position of the camera sensors. The surfaces b, d can be checked in the same way following rotation of the component by 90°.

The optical beam paths shown schematically in dotted lines in FIGS. 1 and 2 are used exclusively by red light, the optical beam paths shown by dashed lines are used exclusively by infrared light and the optical beam paths shown by dotted and dashed lines are used both by red and by infrared light.

The semiconductor component 2 is held on a pick-up. The pick-up is part of a first turning device, which has the form of a star or wheel. This first turning device has on its circumference several, for example eight, pick-ups and can rotate about an axis of rotation. Each of the pick-ups is configured to hold a semiconductor component by means of negative pressure. The first turning device cooperates with a second turning device, which is substantially of identical construction and rotatable about an axis of rotation, wherein the semiconductor component 2 is transferable from the first turning device to the second turning device at a transfer point. The second turning device can likewise comprise an optical examination device, such as shown in FIG. 1.

The first and the second turning device can also be arranged orthogonally to one another.

The variants of the device described above and their structural and operating aspects serve purely for a better understanding of the structure, the mode of operation and the properties; they do not restrict the disclosure just to the exemplary embodiments. The figures are partly schematic, wherein substantial properties and effects are depicted significantly enlarged in some cases, in order to clarify the functions, active principles, technical configurations and features. In this case every mode of operation, every principle, every technical configuration and every feature which is/are disclosed in the figures or in the text can be combined freely and in any way with all claims, every feature in the text and in the other figures, other modes of operation, principles, technical configurations and features that are contained in this disclosure or result from it, so that all conceivable combinations are to be associated with the procedure described. Combinations between all individual implementations in the text, meaning in each section of the description, in the claims and also combinations between different variants in the text, in the claims and in the figures are also included in this case. Even the claims do not limit the disclosure and thus the combination possibilities of all features demonstrated with one another. All disclosed features are explicitly disclosed here also individually and in combination with all other features.

The invention claimed is:

1. An optical examination device for rectangular semiconductor components detached from a substrate, comprising:
    an extraction device, which comprises a first receiving unit, which receives a single rectangular semiconductor component detached from a substrate, and a second receiving unit, which conveys the semiconductor component into an examination position,
    a first illumination arrangement, a second illumination arrangement and an imaging device, wherein
    the imaging device comprises at least a first imaging sensor and a second imaging sensor, wherein the first imaging sensor and the second imaging sensor are pointed at different surfaces respectively of the semiconductor component located in the examination position, and
    the first illumination arrangement consists of one or more LEDs, which are configured to emit infrared light onto two perpendicular and adjoining surfaces of the semiconductor component facing away from the imaging device, wherein the infrared light fully penetrates the semiconductor component at least proportionally, and
    the second illumination arrangement consists of one or more LEDs, which are configured to emit visible light onto two perpendicular and adjoining surfaces of the semiconductor component facing the imaging device, which surfaces lie opposite to the surfaces onto which infrared light from the first illumination arrangement is directed,
    the first illumination arrangement and the second illumination arrangement illuminate the semiconductor component simultaneously, and
    the first imaging sensor and a second imaging sensor are each configured and arranged to detect both the light spectrum emitted by the first illumination arrangement and the light spectrum emitted by the second illumination arrangement, and
    to provide for downstream evaluation on the basis of both the visible and the infrared light spectrum a separate image capture in each case for determining property defects or damage of the semiconductor component,
    wherein the imaging sensors use the same optical beam path, at least in sections, to record the visible light reflected by the component and to record the infrared light penetrating the component.

2. An optical examination device for rectangular semiconductor components detached from a substrate, comprising:

a turning device, which has the form of a star or wheel and which comprises a plurality of pick-ups, which are each configured to hold a rectangular semiconductor component by means of negative pressure, a first illumination arrangement, a second illumination arrangement and an imaging device, wherein the imaging device comprises at least a first imaging sensor and a second imaging sensor, wherein the first imaging sensor and the second imaging sensor are pointed at different surfaces of a semiconductor component, which is held by one of the pick-ups, and the first illumination arrangement consists of several LEDs, which emit infrared light perpendicularly onto two opposing surfaces facing away from the imaging device of the semiconductor component held by the pick-up, wherein the infrared light fully penetrates the semiconductor component at least proportionally, and the second illumination arrangement consists of several LEDs, which emit visible light perpendicularly onto two opposing surfaces facing the imaging device of the semiconductor component held by the pick-up, wherein the first illumination arrangement and the second illumination arrangement illuminate the semiconductor component simultaneously, and the first imaging sensor and a second imaging sensor are each configured and arranged to detect both the light spectrum emitted by the first illumination arrangement and the light spectrum emitted by the second illumination arrangement, and to provide respectively for downstream evaluation on the basis of both the visible and the infrared light spectrum a separate image capture in each case for determining property defects or damage of the semiconductor component, wherein the imaging sensors use the same optical beam path, at least in sections, to record the visible light reflected by the component and to record the infrared light penetrating the component.

3. The optical examination device according to claim 2, wherein the examination device comprises a number of optically active elements.

4. The optical examination device according to claim 2, wherein the examination device comprises at least one half mirror, wherein the half mirror is arranged at an angle of approximately 45° to the optical axis of the imaging device and serves to couple light of the first and/or second illumination arrangement optically and to direct it onto the component, and wherein the half mirror is suitable and arranged to direct the visible light reflected by the component and the infrared light penetrating the component onto the imaging device.

5. The optical examination device according to claim 2, wherein the first and/or the second illumination arrangement consists/consist of one or more LED(s), wherein the LED(s) of the first illumination arrangement emits/emit infrared light—1200 nm plus minus 100 nm—, and/or the LED(s) of the second illumination arrangement emits/emit red light—630 nm plus minus 30 nm—.

6. The optical examination device according to claim 5, wherein the LED(s) of the first and/or the second illumination arrangement are arranged so that they illuminate respectively a plurality of surfaces of the semiconductor component, and/or the light emitted by the first and/or the second illumination arrangement is reflected/directed by optically active elements onto a plurality of surfaces of the semiconductor component.

7. The optical examination device according to claim 2, wherein the first illumination arrangement and/or the second illumination arrangement and/or a single or a plurality of optically active element(s) are configured and arranged to be respectively oriented and/or calibrated/focused independently of the others.

8. The optical examination device according to claim 1, wherein the visible light of the second illumination arrangement is conducted by an optically active element, which is respectively configured and arranged to have a predetermined degree of permeability for visible light in the emission direction of the second illumination arrangement and to have a predetermined degree of reflection of visible and infrared light from the direction opposed by 180° in each case, wherein the reflection direction of the visible light and of the infrared light is unequal to the emission directions of the second illumination arrangement and the directions opposed to it by 180°, and the imaging device consists of a first camera and a second camera, wherein both cameras are configured and arranged to provide image captures on the basis of visible and infrared light, wherein each of the two cameras is pointed at one of the surfaces of the semiconductor component onto which visible light is directed by the second illumination arrangement.

9. The optical examination device according to claim 2, wherein both the visible and the infrared light is to be conducted respectively by an optically active element, which is configured and arranged to have a predetermined degree of permeability for visible and infrared light in the respectively common emission direction of the first and second illumination arrangement and to have a predetermined degree of reflection of visible and infrared light from the direction opposed by 180° in each case, wherein the reflection direction of the visible light and of the infrared light is unequal to the common emission directions of the first and second illumination arrangement and the direction opposed to it by 180°, and the imaging device consists of a first camera and a second camera, wherein both cameras are configured and arranged to provide image captures on the basis of visible and infrared light, wherein each of the two cameras is pointed at one of the surfaces of the semiconductor component onto which light is directed by the first and second illumination arrangement.

10. A method for the optical examination of semiconductor components with a device according to claim 1 or a device according to claim 2, comprising the following method steps:

illumination of two different surfaces of a semiconductor component held by a receiving unit or a pick-up with infrared light, which fully penetrates the semiconductor component at least proportionally, illumination of two different surfaces of the semiconductor component held by the receiving unit or the pick-up with visible light, wherein the surfaces illuminated with visible light lie respectively opposite the surfaces illuminated with infrared light, detection of the visible light reflected by the two surfaces of the component held by a receiving unit or a pick-up that are illuminated by visible light and of the infrared light penetrating the component from the two surfaces illuminated by infrared light by at least one imaging device, which uses at least partially the same optical beam path for this, production of at least two image captures respectively of the surfaces of the component illuminated by visible light, wherein one of the two image captures is produced on the basis of the visible light reflected by the component surface and one is produced on the basis of the infrared light penetrating the component, and examination of the component for defectiveness by downstream image evaluation by means of the image captures.

* * * * *